United States Patent [19]

Yesel et al.

[11] Patent Number: 5,587,905
[45] Date of Patent: Dec. 24, 1996

[54] TRANSMISSION AND ENGINE OVERSPEED CONTROL

[75] Inventors: Leon P. Yesel, East Peoria; John P. Kitzerow, Metamora, both of Ill.

[73] Assignee: Caterpillar Inc., Peoria, Ill.

[21] Appl. No.: 275,861

[22] Filed: Jul. 15, 1994

[51] Int. Cl.$^6$ ..................................................... B60K 41/08
[52] U.S. Cl. ................. 364/424.082; 74/336 R; 477/115
[58] Field of Search .................. 364/424.1; 477/115, 477/165, 110, 107; 74/335, 336 R

[56] References Cited

U.S. PATENT DOCUMENTS

| | | | |
|---|---|---|---|
| 4,425,620 | 1/1984 | Batcheller et al. | 364/424.1 |
| 4,648,290 | 3/1987 | Dunkley et al. | 364/424.1 X |
| 4,930,078 | 5/1990 | Dunkley et al. | 364/424.1 |
| 4,947,331 | 8/1990 | Speranza | 364/424.1 |
| 4,991,455 | 2/1991 | Bulgrien | 364/424.1 X |
| 5,012,416 | 4/1991 | Bulgrien | 364/424.1 |
| 5,043,892 | 8/1991 | Brekkestran et al. | 364/424.1 |
| 5,335,566 | 8/1994 | Genise et al. | 364/424.1 X |
| 5,416,700 | 5/1995 | Bates et al. | 364/424.1 |

*Primary Examiner*—Collin W. Park
*Attorney, Agent, or Firm*—John L. James

[57] ABSTRACT

A method is provided for controlling overspeed conditions of an electronically controlled transmission and engine wherein the transmission has an output shaft and is electronically shiftable by an electronic shift control module between forward and reverse gears to rotate the output shaft in forward and reverse directions and a neutral gear without shaft rotation. The transmission has an operator controlled shift lever for requesting a gear from the forward, neutral and reverse gears and operates in a present gear from among the forward, reverse and neutral gears. The method includes determining forced downshift shift points, overspeed downshift shift points, overspeed upshift shift points, a directional shift inhibit speed, and overspeed values for each gear based on transmission speed; determining output shaft speed; and operating the shift lever to request a gear. The method also includes downshifting the transmission to lowest possible gear, using the forced downshift shift points, without overspeeding for more than 2.2 seconds and sequentially changing gears until the requested gear is reached when the requested gear is a lower gear than the present gear and the requested gear has just been requested; temporarily upshifting the transmission, using the overspeed upshift shift points, when the transmission shaft output speed exceeds speed for present gear for more than 2.5 seconds, then downshifting to the requested gear using the overspeed downshift shift points; downshifting the transmission to lowest possible gear in requested direction of travel, using the forced downshift shift points, in response to a change of direction request when the transmission shaft output speed is overspeed for the requested gear but not above directional shift inhibit speed; and downshifting transmission to lowest possible gear in direction of travel, using the forced downshift shift points, in response to a change of direction request when the transmission shaft output speed exceeds direction shift inhibit speed.

15 Claims, 5 Drawing Sheets

TRANSMISSION AND ENGINE OVERSPEED CONTROL

Technical Field

The present invention pertains to a machine having an engine and an electronically controlled transmission, and, more particularly, to a transmission and engine overspeed control.

BACKGROUND OF THE INVENTION

In a machine, such as a motor grader, for example, an engine and a transmission work together to propel the machine and operate implements, such as a motor grader blade. A gear shift lever is used to select a gear for operating the machine from among a number of forward and reverse gears. Sometimes, when roading, which is moving the motor grader with the blade off the ground, especially when roading downhill, it is possible for the transmission speed to exceed the speed desired for the present gear of the transmission. Such a condition is called an overspeed condition because the transmission overspeeds its gear. It is also possible to have an engine overspeed condition. Overspeed conditions exist outside the range of optimum operating speeds for the machine and cause a decrease in the efficiency of operation and may damage the machine. Overspeed conditions are therefore undesirable. Accordingly, it will be appreciated that it would be highly desirable to control overspeed conditions and prevent damage or excessive wear of the machine.

DISCLOSURE OF THE INVENTION

The present invention is directed to overcoming the overspeed problem set forth above. According to one aspect of the present invention, a method for controlling overspeed conditions of a transmission and engine wherein the transmission has an output shaft and is electronically shiftable by an electronic shift control module between forward and reverse gears to rotate the output shaft in forward and reverse directions and a neutral gear without shaft rotation. The transmission has an operator controlled shift lever for requesting a gear from the forward, neutral and reverse gears and operates in a present gear from in among the forward, reverse and neutral gears. The method comprises the steps of determining forced downshift shift points and storing the forced downshift shift points in a memory portion of the electronic shift control module, determining overspeed downshift shift points and storing the overspeed downshift shift points in a memory portion of the electronic shift control module, determining overspeed upshift shift points and storing the overspeed upshift shift points in a memory portion of the electronic shift control module, determining a directional shift points and speed and storing the directional shift inhibit speed in a memory portion of the electronic shift control module, determining overspeed values for each gear based on transmission output shaft speed and storing the overspeed value for each gear in a memory portion of the electronic shift control module, monitoring speed of the output shaft; and operating the shift lever and requesting a gear from the forward, reverse and neutral gears. The method also includes downshifting the transmission to lowest possible gear, using the forced downshift shift points, without overspeeding for more than a first preselected time and sequentially changing gears until the requested gear is reached when the requested gear is a lower gear than the present gear and the requested gear has just been requested; temporarily upshifting the transmission, using the overspeed upshift shift points, when the transmission shaft output speed exceeds speed for present gear for more than a second preselected time then downshifting to the requested gear using the overspeed downshift shift points; downshifting the transmission to lowest possible gear in requested direction of travel, using the forced downshift shift points, in response to a change of direction request when the transmission shaft output speed is overspeed for the requested gear but not above directional shift inhibit speed; and downshifting transmission to lowest possible gear in direction of travel, using the forced downshift shift points, in response to a change of direction request when the transmission shaft output speed exceeds direction shift inhibit speed.

According to another aspect of the invention an overspeed protection control for an electronic transmission and engine. The transmission has an output shaft and is electronically shiftable between forward and reverse gears to rotate the output shaft in forward and reverse directions and a neutral gear without shaft rotation. Transmission has an operator controlled shift lever for requesting a gear from the forward, neutral and reverse gears and operates in a present gear from among the forward, reverse and neutral gears. The overspeed protection control comprises memory means for storing transmission output shaft speed data and engine speed data representing forced downshift shift points, overspeed downshift shift points, overspeed upshift shift points, a directional shift inhibit speed, and overspeed values for each gear, means for monitoring transmission output shaft speed; and means for requesting a gear from the forward, reverse and neutral gears. The overspeed protection control includes means for downshifting the transmission to lowest possible gear, using the forced downshift shift points, without overspeeding the transmission for more than a first preselected time and sequentially changing gears until the requested gear is reached when the requested gear is a lower gear than the present gear and the requested gear has just been requested; means for temporarily upshifting the transmission, using the overspeed upshift shift points, when the transmission shaft output speed exceeds speed for present gear for more than a second preselected time then downshifting to the requested gear using the overspeed downshift shift points; means for downshifting the transmission to lowest possible gear in requested direction of travel, using the forced downshift shift points, in response to a change of direction request when the transmission shaft output speed is overspeed for the requested gear but not above directional shift inhibit speed; and means for downshifting transmission to lowest possible gear in direction of travel, using the forced downshift shift points, in response to a change of direction request when the transmission shaft output speed exceeds direction shift inhibit speed.

BEST MODE FOR CARRYING OUT THE INVENTION

Figure 1:
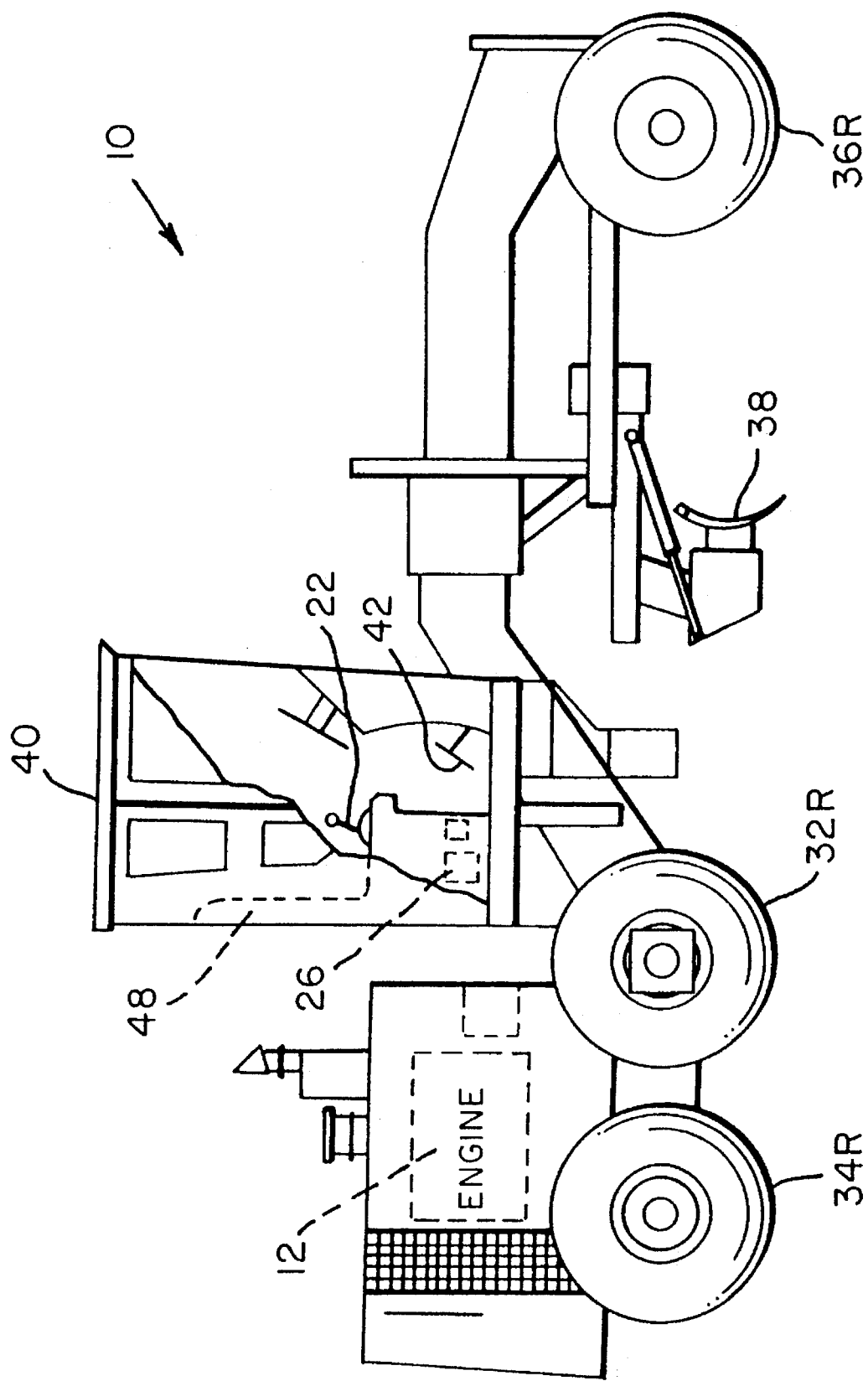
FIG. 1 is a diagrammatic side elevational view of a preferred embodiment of a motor grader constructed for operation in accordance with the present invention.
Figure 2:
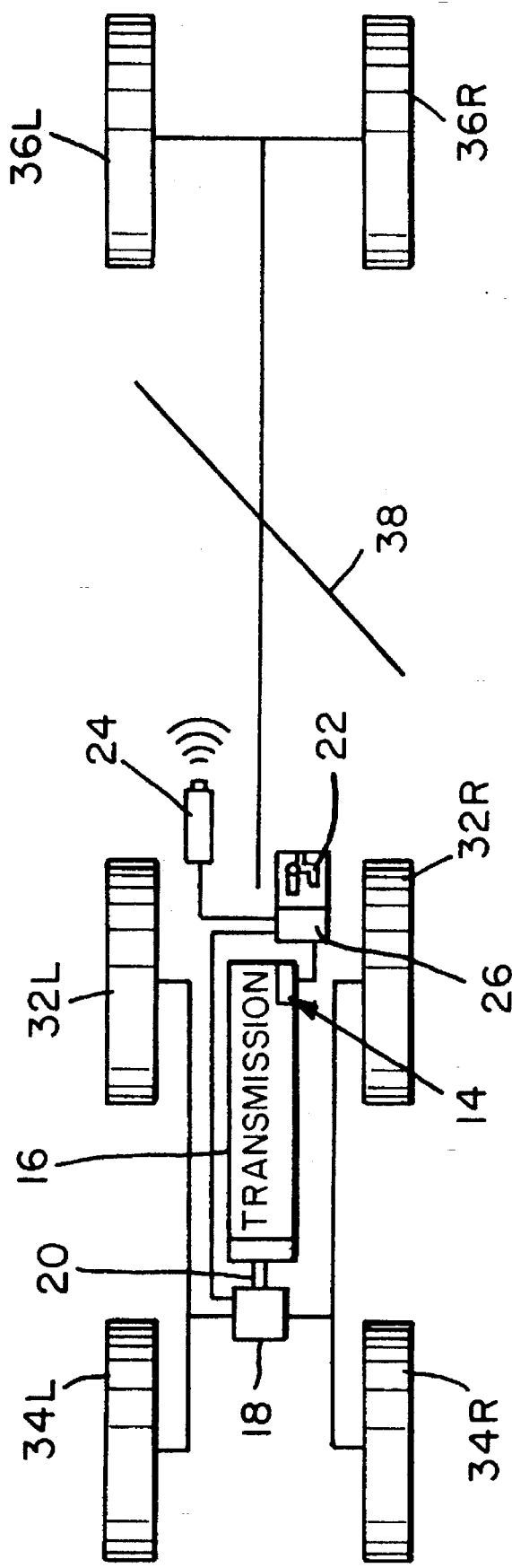
FIG. 2 is a diagrammatic plan view of the motor grader of FIG. 1.
Figure 3:
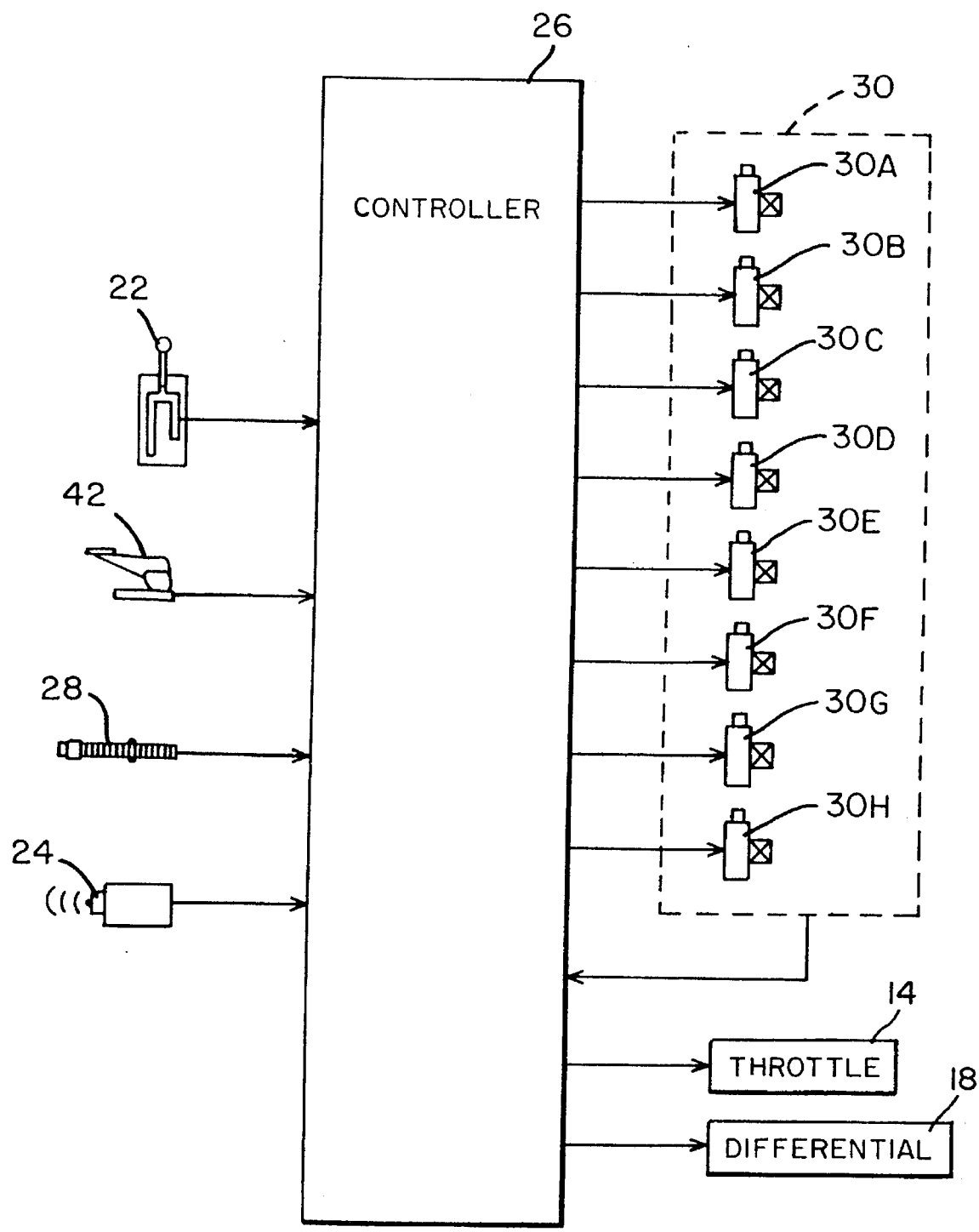
FIG. 3 is a schematic block diagram of the transmission controller of the motor grader of FIG. 1.

Referring to FIGS. 1–3, a machine such as a motor grader 10, has an engine 12 with an engine throttle control 14 for racking the engine and controlling engine speed. A transmission 16 is coupled to the engine 12 and coupled to a differential gearing system 18 by a transmission output shaft 20. The transmission output may be measured in terms of the speed of rotation of its output shaft in rpm. A shift lever 22 is associated with the transmission for shifting the transmission between its various gears which may include a neutral gear as well as 8 forward and 6 reverse gears.

The transmission shift control lever 22 is a multicontact switch that sends position information to a controller 26 to indicate a desired gear for the transmission 16. When the transmission speed, as indicated by a transmission output shaft sensor 28, and the engine speed permit a shift to the desired gear, the controller 26 operates the appropriate transmission solenoids 30. Eight transmission solenoids are illustrated and labeled SA through SH. As is known in the art, the transmission solenoids 30 operate the transmission clutches and thereby determine the actual gear of the transmission.

The differential gear drives the rear wheels 32L, 32R, 34L, 34R, with the left wheels 32L, 34L connected in tandem and the right wheels 32R, 34R also connected in tandem. A pair of steering wheels 36L, 36R are located at the front of the motor grader. The blade 38 of the motor grader is located between the front and rear wheels.

Various operator controls are located in an operator's compartment 40. These controls include the transmission shift lever 22 and inching pedal 42. The controller 26 may be conveniently located under the operator's seat 48. The controller 26 is a microprocessor based electronic module that receives information from the shift lever 22, the inching pedal 42 and the transmission output speed sensor 28. The controller 26 actuates the appropriate solenoids 30A–30H for shifting the transmission 16 to the desired gear.

Figure 4A:
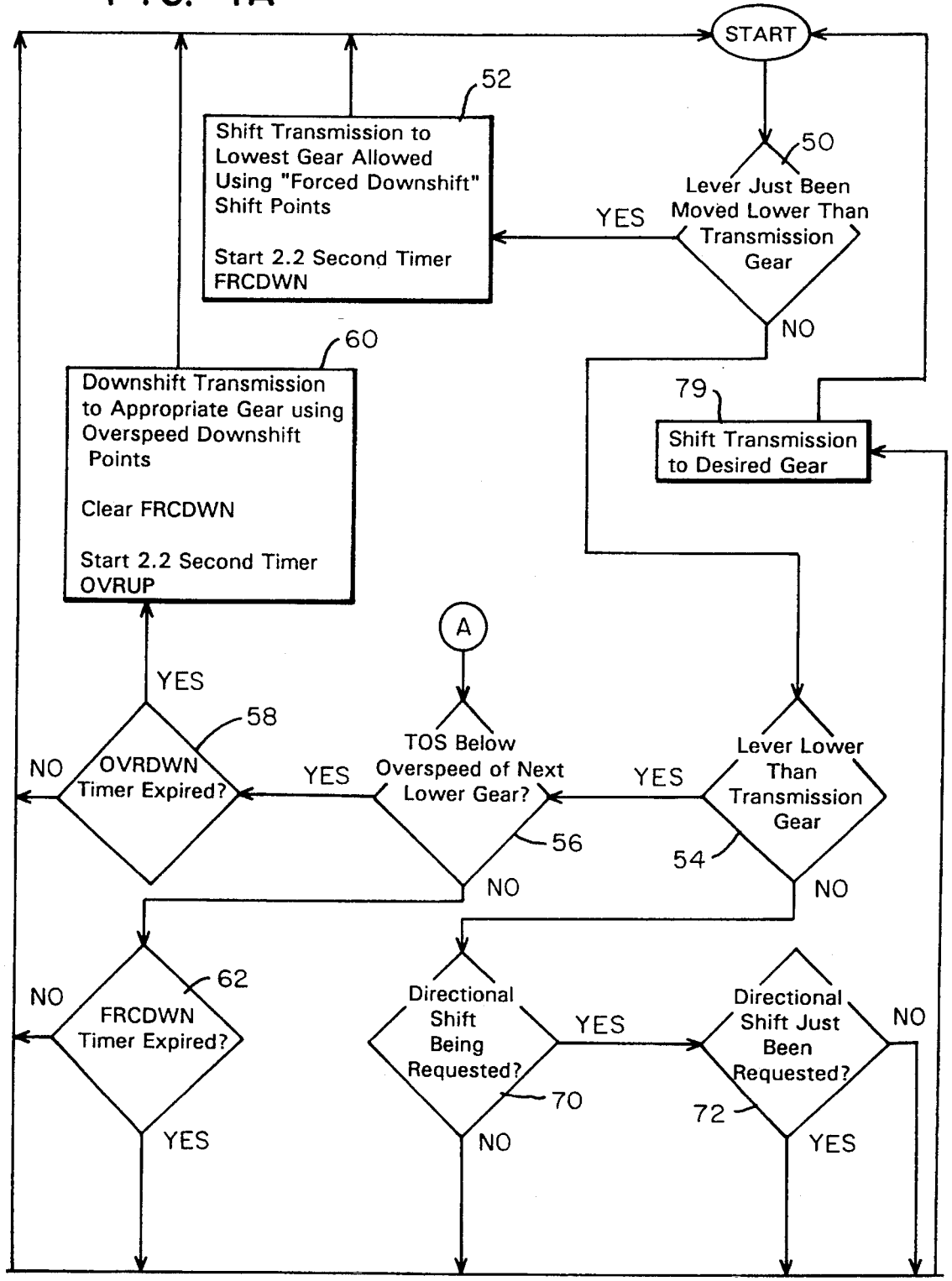
FIGS. 4A and 4B are a flow chart illustrating a method of electronic transmission and engine overspeed protection.
Figure 4B:
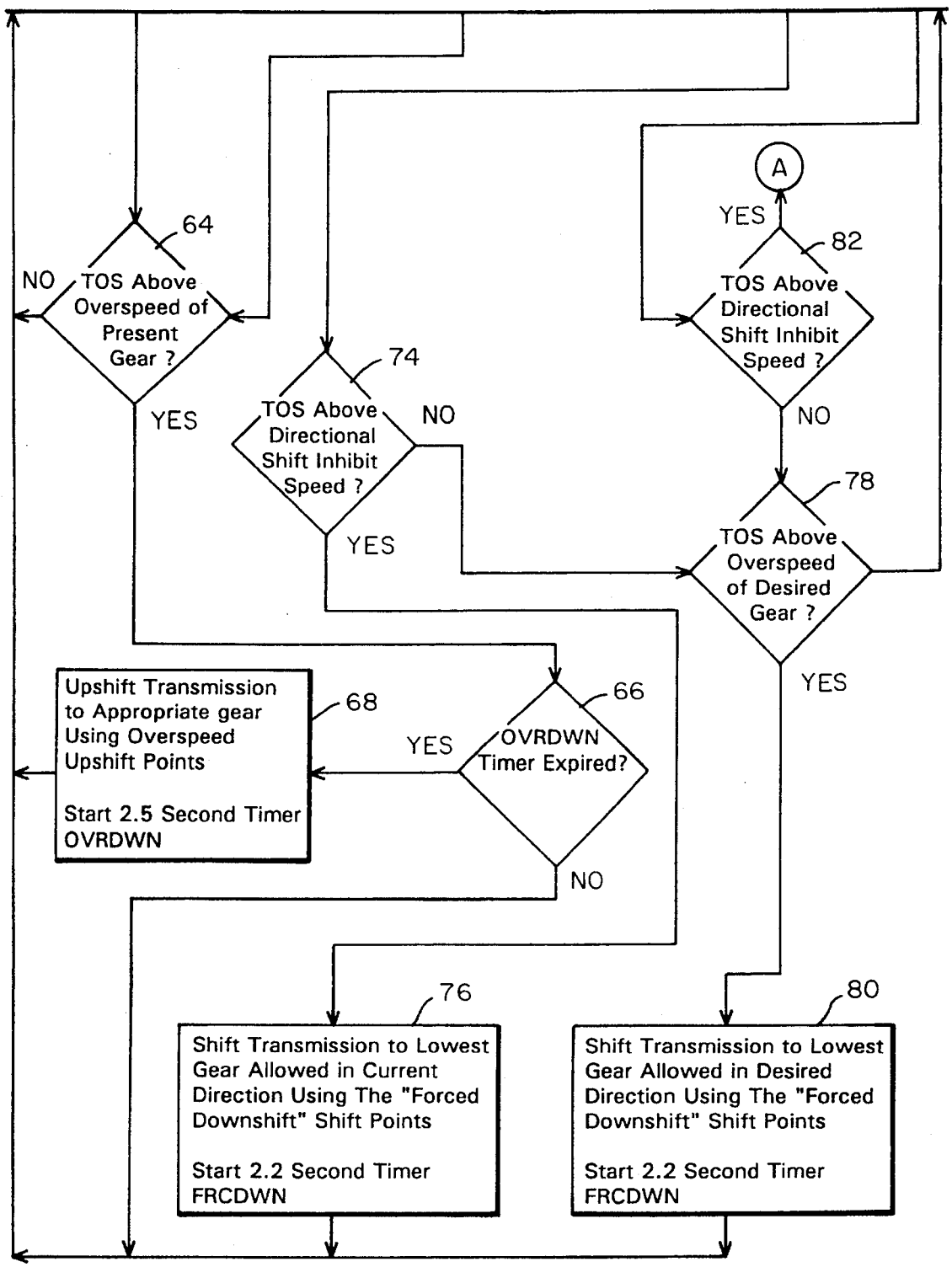

FIGS. 4A and 4B are a flow chart illustrating electronic transmission and engine overspeed protection. The output shaft 20 on the counter shaft transmission 16 has a constant final drive ratio. This permits monitoring of the output shaft 20 for electronic overspeed protection. The transmission output speed sensor 28 is used to monitor the speed of the shaft. Using the signal from the sensor 28 and the transmission's actual present gear as dictated by the transmission solenoid 30, the controller 26 determines whether an overspeed condition is occurring. If an overspeed condition is occurring, tile controller 26 will take the appropriate action.

Overspeed can occur when an operator makes a skipped downshift, for example from the fourth forward gear to the first forward gear. The controller reacts by downshifting to the lowest possible gear without overspeeding and then makes sequential gear changes until it has reached the desired gear as requested by the gear shift lever 22. In another situation, the slope on which the operator is working may exceed the retarding capability of the engine. In such a situation, the controller will automatically upshift. Once the slope has decreased or the operator has braked adequately to slow the machine, the controller will automatically downshift according to the position of the shift lever. Sometimes an operator may make a directional gear change above the transmission output shaft directional change maximum limit. The controller reacts by automatically downshifting to the lowest possible gear in the same direction of travel as the machine and then makes the directional gear change at that time.

The first step in the method for controlling overspeed is determining whether the transmission shift lever 22 has just been moved to request a gear lower than the actual gear of the transmission 16 as indicated by the solenoids 30. By just been moved it is meant moved since the last time the query was made. If the shift lever has just been moved lower than the transmission gear, then at block 52 the controller shifts the transmission to the lowest gear allowed using the forced downshift shift points. As is known in the art, transmission shift points for a machine are set using a number of factors such as engine and transmission speeds and torques and ground speed. These shift points and speed parameters are stored in a memory portion of the controller. When the controller shifts the transmission to the lowest gear allowed using the forced downshift shift points a 2.2 second timer, FRCDWN is started, and the process continues by returning to the first step at decision block 50.

At decision block 50, the query is made whether the shift lever has just been moved lower than the transmission gear. Because this is the second inquiry since moving the lever and the FRCDWN timer is running, the answer is no. The next query at decision block 54 is to determine whether the shift lever is lower than the transmission gear; that is, has a gear been requested that is lower than the present gear. When a lower gear has been requested the next inquiry at decision block 56 is whether the transmission is below overspeed for the next lower transmission gear. If the answer is yes then the inquiry at block 58 is whether an overspeed downshift timer, OVRDWN has expired. If not the process repeats by returning to decision block 50. If the OVRDWN timer has expired then at block 60 the controller downshifts the transmission to the appropriate gear using the overspeed downshift shift points clears the FRCDWN timer and starts a 2.2 second overspeed upshift timer OVRUP. After block 60 the process repeats by returning to decision block 50.

If, at decision block 56, the transmission is not below overspeed of the next lower gear, then the controller determines whether the FRCDWN timer has expired at decision block 62. If the FRCDWN timer has not expired the process returns to decision block 50. If, on the other hand, the FRCDWN timer has expired, the controller then inquires at block 64 whether the transmission is above overspeed of the present gear. If the transmission is not above overspeed of the present gear the process repeats by returning to decision block 50. When the transmission is above overspeed of the present gear, then at decision block 66 the controller determines whether the OVRDWN timer has expired. If the OVRDWN timer has not expired the process repeats by returning to decision block 50. If the OVRDWN timer has expired then at block 68 the controller upshifts the transmission to the appropriate gear using the overspeed upshift shift points and starts the 2.5 second timer, OVRDWN. The process returns to decision block 50 and continues.

The process continues to decision block 70 when the shift lever has been moved at block 50 but is not lower than the transmission gear at block 54. At block 70, a query is made whether a directional shift is being requested. When a directional shift is not being requested, the method proceeds to decision block 64 as described above. When a directional shift is being requested, the controller determines at block 72 whether the directional shift has just been requested. If the directional shift has just been requested, then at decision block 74, the controller determines whether the transmission speed is above the directional shift inhibit speed. If so, then at block 76, the controller shifts the transmission to the lowest gear allowed in the current direction using the forced downshift shift points and starts the 2.2 second timer, FRCDWN. The process then repeats by returning to decision block 50. At block 74, if the transmission speed is not above the directional shift inhibit speed, then at decision block 78, it is determined whether the transmission speed is above overspeed of the requested gear. When the answer is yes, then at block 80, the controller shifts the transmission to the lowest gear allowed in the desired direction using the forced downshift shift points and starts the 2.2 second timer, FRCDWN. When the answer is no, then at block 79, the controller shifts the transmission to the desired gear.

At decision block 72, when the directional shift has not just been requested, then at decision block 82 the inquiry is made whether the transmission speed is above the directional shift inhibit speed. If the answer is no, the controller proceeds to block 78 to query whether the transmission speed is above overspeed of the desired gear. On the other hand, when the transmission speed is above the directional shift inhibit speed at block 82, then the process continues to decision block 56 as described above.

A no answer at decision block 78 means that the transmission will shift to the requested gear.

INDUSTRIAL APPLICABILITY

During operation the shift lever 22 must remain in a new gear position for at least 0.1 seconds before the controller 26 determines that the shift lever position has changed to request a new gear. When upshifting, the gear lever is moved from the current gear position to a higher gear position and the controller 26 shifts the transmission 16 immediately. Downshifting is started when the operator moves the shift lever from the current gear position to a lower gear position. If the downshift can be made without overspeeding the transmission, the downshift is made immediately. If an overspeed condition will occur, the transmission is shifted to the lowest gear possible using the forced downshift shift points. The forced downshift shift points were selected based on the highest speed the transmission can survive for a short duration of approximately 2.2 seconds. If after 2.2 seconds the transmission speed has not lowered below an overspeed condition, the controller will upshift and use the overspeed downshift shift points to obtain the desired gear. If within 2.2 seconds the transmission speed has lowered below an overspeed condition, the controller will again compare the desired gear against the present transmission gear. If they are the same, the downshift is complete. If the transmission gear remains higher than the requested gear, the overspeed downshift shift points are used to obtain the desired gear.

In shifting out of neutral, when the shift handle is moved from neutral into a position that matches the direction the machine is moving, the controller will first check transmission speed and determine whether the requested gear can be obtained without overspeeding the transmission. If an overspeed condition will not occur, then the shift is made. If the shift out of neutral to the requested gear will cause an overspeed condition, the controller will shift to the lowest possible gear using the forced downshift shift points. If after 2.2 seconds the transmission speed has not lowered below an overspeed condition, the controller will upshift and use overspeed downshift shift points to obtain the desired gear. If within 2.2 seconds the transmission speed has lowered below an overspeed condition, the control will again compare the desired gear against the present transmission gear. If they are the same, the downshift is complete. If the transmission gear remains higher than the desired gear, the overspeed downshift shift points are used to obtain the desired gear. When the shift lever is moved from a gear position to neutral, the controller will shift the transmission to neutral immediately.

A directional shift request is made when the shift lever is moved from one gear position to another gear position of the opposite direction or when a shift out of neutral is requested with the machine moving in the opposite direction from the direction requested. If the shift is requested with a transmission speed lower than third gear high idle, the shift will be made immediately. If the shift is requested with a transmission speed higher than third gear high idle, the following steps will be taken. First, the controller will attempt to downshift the transmission to the lowest gear possible using the forced downshift shift points. If this initial downshift slows the machine enough to lower transmission speed below third gear high idle, then the directional shift is made. If the machine has not slowed to third gear high idle, then the overspeed downshift shift points are used to downshift the transmission until transmission speed is below third gear high idle.

The controller will automatically upshift above the shift lever position when the transmission reaches the overspeed upshift shift point. These upshifts correspond to an engine speed of 3,000 rpm. There is no limit to the number of upshifts allowed. If the controller has already automatically upshifted because of an overspeed condition, the controller will automatically downshift whenever the transmission reaches the overspeed downshift shift points. These downshifts correspond to an engine speed of 2,300 rpm. The controller will automatically downshift until the transmission gear matches the shift lever position. The shift lever must remain in a new gear position for at least 0.1 seconds before the controller determines that the shift lever position has changed.

As is evident from the foregoing description, certain aspects of the invention are not limited to the particular details of the examples illustrated, and it is therefore contemplated that other modifications and applications will occur to those skilled in the art. For example, the timers may be set for different values than those indicated. It is accordingly intended that the claims shall cover all such modifications and applications as do not depart from the true spirit and scope of the invention.

What is claimed is:

1. A method for controlling overspeed conditions of an electronically controlled transmission and engine, said transmission having an output shaft and being electronically shiftable by an electronic shift control module between forward and reverse gears to rotate said output shaft in forward and reverse directions and a neutral gear without shaft rotation, said transmission having an operator controlled shift lever for requesting a gear from said forward, neutral and reverse gears, said transmission operating in a present gear from among said forward, reverse and neutral gears; said method comprising the steps of:

determining forced downshift shift points and storing said forced downshift shift points in a memory portion of said electronic shift control module;

determining overspeed downshift shift points and storing said overspeed downshift shift points in a memory portion of said electronic shift control module;

determining overspeed upshift shift points and storing said overspeed upshift shift points in a memory portion of said electronic shift control module;

determining a directional shift inhibit speed and storing said directional shift inhibit speed in a memory portion of said electronic shift control module;

determining overspeed values for each gear based on engine speed and transmission output shaft speed and storing said overspeed value for each gear in a memory portion of said electronic shift control module;

monitoring engine speed;

monitoring speed of said output shaft;

determining whether said shift lever is operated to request a gear from said forward, reverse and neutral gears;

downshifting said transmission to lowest possible gear using said forced downshift shift points and sequentially changing gears until the requested gear is reached when said requested gear is a lower gear than said present gear and said requested gear is newly requested, and setting a forced downshift timer for a first preselected time duration and preventing said transmission shaft output speed from exceeding the overspeed value for more than said first preselected time duration;

temporarily upshifting said transmission, using said overspeed upshift shift points, when said transmission shaft output speed exceeds speed for present gear for more than a second preselected time set by an overspeed downshift timer then downshifting to said requested gear using said overspeed downshift shift points;

downshifting said transmission to lowest possible gear in requested direction of travel, using said forced downshift shift points, in response to a change of direction request when said transmission shaft output speed is above the overspeed value for said requested gear but not above the directional shift inhibit speed; and downshifting transmission to lowest possible gear in present direction of travel, using said forced downshift shift points, in response to a change of direction request when said transmission shaft output speed exceeds direction shift inhibit speed.

2. A method, as set forth in claim 1, wherein said first preselected time duration is about 2.2 seconds.

3. A method, as set forth in claim 1, wherein said second preselected time duration is about 2.5 seconds.

4. A method for controlling overspeed conditions of an electronically controlled transmission and engine, said transmission having an output shaft and being electronically shiftable by an electronic shift control module between forward and reverse gears to rotate said output shaft in forward and reverse directions and a neutral gear without shaft rotation, said transmission having an operator controlled shift lever for requesting a gear from said forward, neutral and reverse gears, said transmission operating in a present gear from among said forward, reverse and neutral gears; said method comprising the steps of:

a. determining forced downshift shift points and storing said forced downshift shift points in a memory portion of said electronic shift control module;

b. determining whether said control member is newly operated to request a gear lower than the present gear;

c. shifting said transmission to lowest gear allowed using forced downshift shift points when newly requested gear is lower than present gear; and d. starting a forced downshift timer and repeating steps 4b–4c for duration of said forced downshift timer until requested gea than present gear thereby preventing said transmission output shaft from overspeeding for more than the duration of said forced downshift timer.

5. A method, as set forth in claim 4, including:

a determining overspeed downshift shift points and storing said overspeed downshift shift points in a memory portion of said electronic shift control module;

b. determining an overspeed value for each gear and storing said overspeed value for each gear in a memory portion of said electronic shift control module;

c. determining said transmission output shaft speed and engine speed;

d. determining whether said control member has been operated to request a gear lower than the present gear;

e. determining whether shaft output speed is above the overspeed value for next lower gear;

f. shifting said transmission to appropriate gear using overspeed downshift shift points if an overspeed downshift timer is expired and shaft output speed is above the overspeed value for next lower gear;

g. starting an overspeed downshift timer and clearing said forced downshift timer; and h. repeating steps 4b–4d and 5a–5b if said overspeed downshift timer is not expired and shaft output speed is above the overspeed value for next lower gear.

6. A method, as set forth in claim 5, including:

a. determining overspeed upshift shift points and storing said overspeed upshift shift points in a memory portion of said electronic shift control module;

b. determining whether shaft output speed is above the overspeed value for present gear when said forced downshift timer is expired and shaft output speed is not above the overspeed value for next lower gear;

c. repeating step 4b if shaft output speed is not above the overspeed value for present gear;

d. determining whether said overspeed downshift timer has expired;

e. repeating step 4b when said overspeed downshift timer has not expired; and f. upshifting said transmission to an appropriate gear using overspeed upshift shift points if said overspeed downshift timer is not expired and shaft output speed is above the overspeed value for present gear and resetting said overspeed downshift timer.

7. A method, as set forth in claim 5, including:

a. determining a directional shift inhibit speed and storing said directional shift inhibit speed in a memory portion of said electronic shift control module;

b. determining whether a directional shift is being requested;

c. proceeding to step 5b if a directional shift is not being requested;

d. determining whether the directional shift is newly requested;

e. determining whether the output shaft speed is above shift inhibit speed; and f. shifting said transmission to lowest gear allowed in current direction of travel using the forced downshift shift points when the directional shift is newly requested and the output shaft speed is above shift inhibit speed and starting the forced downshift timer.

8. A method, as set forth in claim 7, including:

continuing with step 5b after step 7a when the output shaft speed is above shift inhibit speed and a directional shift is not newly requested.

9. A method, as set forth in claim 5, including:

a. determining whether the output shaft speed is above the overspeed value of the gear selected with said control member; and b. shifting said transmission to lowest gear allowed in desired direction of travel using the forced downshift shift points when the output shaft speed is above overspeed for the requested gear, and starting the forced downshift timer.

10. A method, as set forth in claim 9, including:
continuing with step 9a when the output shaft speed is not above shift inhibit speed and a directional shift is not newly requested.

11. A method for controlling overspeed conditions of an electronically controlled transmission and engine, said transmission having an output shaft and being electronically shiftable by an electronic shift control module between forward and reverse gears to rotate said output shaft in forward and reverse directions and a neutral gear without shaft rotation, said transmission having an operator controlled shift lever for requesting a gear from said forward, neutral and reverse gears, said transmission operating in a present gear from among said forward, reverse and neutral gears; said method comprising the steps of:

determining forced downshift shift points and storing said forced downshift shift points in a memory portion of said electronic shift control module;

determining whether said control member is newly operated to request a gear lower than the present gear;

shifting said transmission to lowest gear allowed using forced downshift shift points when newly requested gear is lower than present gear;

setting an overspeed downshift timer;

determining overspeed downshift shift points and storing said overspeed downshift shift points in a memory portion of said electronic shift control module;

determining overspeed values for each gear based upon engine speed and transmission output shaft speed and storing said overspeed value for each gear in a memory portion of said electronic shift control module;

shifting said transmission to appropriate gear using overspeed downshift shift points if said overspeed downshift timer is expired, output shaft speed is not above the overspeed value for next lower gear, and the requested gear is lower than the present gear.

12. A method for controlling overspeed conditions of an electronically controlled transmission and engine, said transmission having an output shaft and being electronically shiftable by an electronic shift control module between forward and reverse gears to rotate said output shaft in forward and reverse directions and a neutral gear without shaft rotation, said transmission having an operator controlled shift lever for requesting a gear from said forward, neutral and reverse gears, said transmission operating in a present gear from among said forward, reverse and neutral gears; said method comprising the steps of:

determining forced downshift shift points and storing said forced downshift shift points in a memory portion of said electronic shift control module;

determining whether said control member is newly operated to request a gear lower than the present gear;

shifting said transmission to lowest gear allowed using forced downshift shift points when newly requested gear is lower than present gear;

setting an overspeed downshift timer;

setting a forced downshift timer;

determining overspeed upshift shift points and storing said overspeed upshift shift points in a memory portion of said electronic shift control module;

determining overspeed values for each gear based upon engine speed and transmission output shaft speed and storing said overspeed value for each gear in a memory portion of said electronic shift control module;

upshifting said transmission to an appropriate gear using overspeed upshift shift points if said overspeed downshift timer is expired, output shaft speed is above the overspeed value for the present gear, the requested gear is lower than the present gear, the forced downshift timer is expired and the output shaft speed is at or above the overspeed value for next lower gear.

13. A method for controlling overspeed conditions of an electronically controlled transmission and engine, said transmission having an output shaft and being electronically shiftable by an electronic shift control module between forward and reverse gears to rotate said output shaft in forward and reverse directions and a neutral gear without shaft rotation, said transmission having an operator controlled shift lever for requesting a gear from said forward, neutral and reverse gears, said transmission operating in a present gear from among said forward, reverse and neutral gears; said method comprising the steps of:

determining forced downshift shift points and storing said forced downshift shift points in a memory portion of said electronic shift control module;

determining whether said control member is newly operated to request a gear lower than the present gear;

shifting said transmission to lowest gear allowed using forced downshift shift points when newly requested gear is lower than present gear;

determining forced downshift shift points and storing said forced downshift shift points in a memory portion of said electronic shift control module;

determining a directional shift inhibit speed and storing said directional shift inhibit speed in a memory portion of said electronic shift control module;

determining whether a directional shift is newly requested;

determining whether the output shaft speed is above shift inhibit speed;

shifting said transmission to lowest gear allowed in current direction of travel using the forced downshift shift points when the directional shift is newly requested and the output shaft speed is above shift inhibit speed; and starting a forced downshift timer having a preselected time duration thereby preventing said transmission output shaft from overspeeding for more than the duration of said forced downshift timer.

14. A method for controlling overspeed conditions of an electronically controlled transmission and engine, said transmission having an output shaft and being electronically shiftable by an electronic shift control module between forward and reverse gears to rotate said output shaft in forward and reverse directions and a neutral gear without shaft rotation, said transmission having an operator controlled shift lever for requesting a gear from said forward, neutral and reverse gears, said transmission operating in a present gear from among said forward, reverse and neutral gears; said method comprising the steps of:

determining forced downshift shift points and storing said forced downshift shift points in a memory portion of said electronic shift control module;

determining whether said control member is newly operated to request a gear lower than the present gear;

shifting said transmission to lowest gear allowed using forced downshift shift points when newly requested gear is lower than present gear;

determining forced downshift shift points and storing said forced downshift shift points in a memory portion of said electronic shift control module;

determining a directional shift inhibit speed and storing said directional shift inhibit speed in a memory portion of said electronic shift control module;

determining overspeed values for each gear based upon engine speed and transmission output shaft speed and storing said overspeed value for each gear in a memory portion of said electronic shift control module;

determining whether a directional shift is newly requested;

determining whether the output shaft speed is above shift inhibit speed;

determining whether the output shaft speed is above the overspeed value of the requested gear;

shifting said transmission to lowest gear allowed in desired direction of travel using the forced downshift shift points when the output shaft speed is above the overspeed value for the requested gear and not above shift inhibit speed; and starting a forced downshift timer having a preselected time duration thereby preventing said transmission output shaft from overspeeding for more than the duration of said forced downshift timer.

15. An electronic overspeed protection control for a transmission and engine, said transmission having an output shaft and being electronically shiftable between forward and reverse gears to rotate said output shaft in forward and reverse directions and a neutral gear without shaft rotation, said transmission having an operator controlled shift lever for requesting a gear from said forward, neutral and reverse gears, said transmission operating in a present gear from among said forward, reverse and neutral gears; said electronic overspeed protection control comprising:

memory means for storing transmission output shaft speed data and engine speed data representing forced downshift shift points, overspeed downshift shift points, overspeed upshift shift points, a directional shift inhibit speed, and overspeed values for each gear, means for monitoring transmission output shaft speed;

means for requesting a gear from said forward, reverse and neutral gears;

means for downshifting said transmission to lowest possible gear using said forced downshift shift points and sequentially changing gears until the requested gear is reached when said requested gear is a lower gear than said present gear and said requested gear is newly requested, and setting a forced downshift timer for a first preselected time duration and preventing said transmission shaft output speed from exceeding the overspeed values for more than said first preselected time duration;

means for temporarily upshifting said transmission, using said overspeed upshift shift points, when said transmission shaft output speed exceeds speed for present gear for more than a second preselected time set by an overspeed downshift timer then downshifting to said requested gear using said overspeed downshift shift points;

means for downshifting said transmission to lowest possible gear in requested direction of travel, using said forced downshift shift points, in response to a change of direction request when said transmission shaft output speed is above the overspeed value for said requested gear but not above the directional shift inhibit speed; and means for downshifting said transmission to lowest possible gear in present direction of travel, using said forced downshift shift points, in response to a change of direction request when said transmission shaft output speed exceeds said direction shift inhibit speed.

* * * * *

UNITED STATES PATENT AND TRADEMARK OFFICE
CERTIFICATE OF CORRECTION

PATENT NO. : 5,587,905

DATED : December 24, 1996

INVENTOR(S) : Leon P. Yesel et al.

It is certified that error appears in the above-identified patent and that said Letters Patent is hereby corrected as shown below:

Claim 4, column 7, line 58 after the word "requested", delete "gea" and insert --gear is not lower--.

Signed and Sealed this

Fifteenth Day of April, 1997

Attest:

BRUCE LEHMAN

Attesting Officer

Commissioner of Patents and Trademarks